United States Patent
Kumar et al.

(10) Patent No.: US 11,544,133 B2
(45) Date of Patent: Jan. 3, 2023

(54) SYSTEM AND METHOD FOR DYNAMIC LOG MANAGEMENT OF STREAM PROCESSING IN A DISTRIBUTED ENVIRONMENT

(71) Applicant: ORACLE INTERNATIONAL CORPORATION, Redwood Shores, CA (US)

(72) Inventors: Santosh Kumar, Bengaluru (IN); Yathish Gatty, Bengaluru (IN); Devendra Jain, Noida (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/408,750

(22) Filed: May 10, 2019

(65) Prior Publication Data
US 2020/0356433 A1   Nov. 12, 2020

(51) Int. Cl.
*G06F 11/07*   (2006.01)
*G06F 16/2455*   (2019.01)

(52) U.S. Cl.
CPC ...... *G06F 11/0787* (2013.01); *G06F 11/0709* (2013.01); *G06F 11/0781* (2013.01); *G06F 16/24568* (2019.01)

(58) Field of Classification Search
CPC ............ G06F 11/0781; G06F 11/0787; G06F 11/0709; G06F 16/24568; G06F 16/2358; G06F 16/2379; G06F 11/3636; G06F 11/366; G06F 11/3072; G06F 11/3476; G06F 11/3006
See application file for complete search history.

(56) References Cited

U.S. PATENT DOCUMENTS 11,030,046 B1 *   6/2021   Li ...................... G06F 16/215
11,086,688 B2 *   8/2021   Bishop ................ G06F 9/5083
(Continued)

OTHER PUBLICATIONS

Oracle® Corporation, NPL_administering-oracle-stream-analytics. pdf: Oracle Corporation, "Oracle Fusion Middleware Administering Oracle Stream Analytics", Aug. 2018, 223 pages.
(Continued)

*Primary Examiner* — Matthew M Kim
*Assistant Examiner* — Kyle Emanuele
(74) *Attorney, Agent, or Firm* — Tucker Ellis LLP

(57) ABSTRACT

A system and method for dynamic log management of stream processing in a distributed computing environment, such as, for example, a streaming application or stream analytics system. A streaming application can be deployed or published to a cluster, to execute as a client application. A cluster manager coordinates with worker nodes, to commit tasks associated with the streaming application. If a need arises to generate lower-level log data associated with the streaming application, for example to diagnose an underlying cause of a warning/error message, a configuration job can be committed to the cluster to execute as a separate log-configuration application. The log-configuration application operates with the cluster manager to determine the set of working nodes currently associated with the streaming application, and modify the logger configuration at those nodes, to record or otherwise provide log data according to a modified logging level, for example to provide lower-level log messages.

18 Claims, 16 Drawing Sheets

(56) References Cited

U.S. PATENT DOCUMENTS

| | | | | |
|---|---|---|---|---|
| 2011/0029484 | A1* | 2/2011 | Park | G06F 16/217 |
| | | | | 707/634 |
| 2011/0029485 | A1* | 2/2011 | Park | G06F 16/2358 |
| | | | | 707/634 |
| 2012/0179809 | A1* | 7/2012 | Barsness | G06F 16/24568 |
| | | | | 709/224 |
| 2014/0149576 | A1* | 5/2014 | Pavlov | G06F 11/0781 |
| | | | | 709/224 |
| 2014/0359742 | A1* | 12/2014 | Bautin | H04L 63/029 |
| | | | | 726/7 |
| 2015/0103837 | A1* | 4/2015 | Dutta | H04L 47/125 |
| | | | | 370/401 |

OTHER PUBLICATIONS

Oracle® Corporation, NPL_Oracle Stream Analytics 18.pdf; Alex Kotopoulis,"Oracle Stream Analytics 18.1 has been released", May 10, 2018, 2 pages.

Oracle® Corporation, NPL_Oracle Stream Analytics Bundle Patch released.pdf: Alex Kotopoulis,"Oracle Stream Analytics Bunle Patch Released (18.1.0.0.1)", Jul. 2, 2018, 1 pages.

Oracle® Corporation, NPL_oracle-stream-analytics-release-notes. pdf: Oracle Corporation,"Oracle Fusion Middleware Oracle Stream Analytics Release Notes", Aug. 2018, 8 pages.

Oracle® Corporation, NPL_understanding-oracle-stream-analytics. pdf: Oracle Corporation,"Oracle Fusion Middleware Understanding Stream Analytics", Apr. 2019, 40 pages.

Oracle® Corporation, NPL_using-oracle-stream-analytics_april2019. pdf: Oracle Corporation,"Oracle Fusion Middleware Using Oracle Stream Analytics", Apr. 2019, 134 pages.

Oracle® Corporation, NPL_using-oracle-stream-analytics_august2018. pdf: Oracle Corporation,"Oracle Fusion Middleware Using Oracle Stream Analytics", Aug. 2018, 96 pages.

Oracle® Corporation, NPL_using-oracle-stream-analytics_may2018. pdf: Oracle Corporation,"Oracle Fusion Middleware Using Oracle Stream Analytics", May 2018, 130 pages.

* cited by examiner

SYSTEM AND METHOD FOR DYNAMIC LOG MANAGEMENT OF STREAM PROCESSING IN A DISTRIBUTED ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to distributed computing, streaming applications, and stream analytics, and are particularly related to systems and methods for dynamic log management of stream processing in a distributed computing environment.

BACKGROUND

Distributed computing environments, such as, for example, streaming application or stream analytics systems, enable large amounts of data to be processed as streams, which can then be analyzed to provide useful information. Such systems provide a platform for business users to design, validate, and deploy streaming software applications (streaming applications), to meet their business needs.

A typical stream analytics system may comprise multiple processing instances, executing at multiple hosts or nodes. Stream processing components can generate processing logs on those nodes, for use in monitoring the health of the streaming applications.

Since a streaming application is often designed to run continuously, i.e., on a 24×7 basis, the processing logs that are generated at the nodes are typically configured to record only important warning/error messages, or a reduced set of information log messages, to improve system performance and reduce space requirements.

However, when the system encounters frequent warnings/errors, there may be a need to diagnose an underlying or root cause associated with those warnings/errors. These are some examples of the types of environments in which embodiments described herein can be used.

SUMMARY

In accordance with an embodiment, described herein is a system and method for dynamic log management of stream processing in a distributed computing environment, such as, for example, a streaming application or stream analytics system.

A streaming application can be deployed or published to a cluster, to execute as a client application. A cluster manager coordinates with worker nodes, to commit tasks associated with the streaming application.

If a need arises to generate lower-level log data associated with the streaming application, for example to diagnose an underlying cause of a warning/error message, a configuration job can be committed to the cluster to execute as a separate log-configuration application.

The log-configuration application operates with the cluster manager to determine the set of working nodes currently associated with the streaming application, and modify the logger configuration at those nodes, to record or otherwise provide log data according to a modified logging level, for example to provide lower-level log messages.

DETAILED DESCRIPTION

Figure 1:
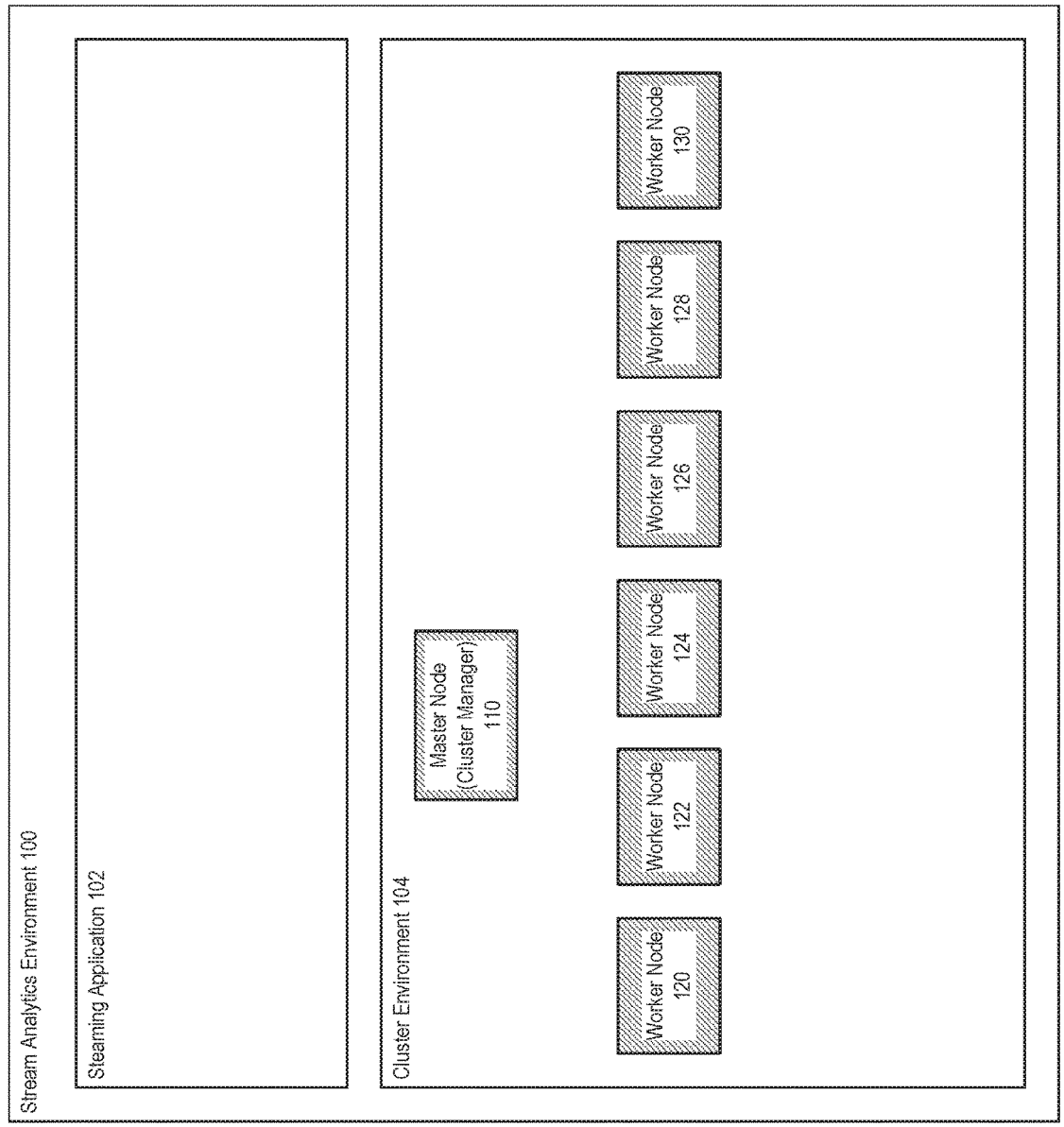
FIG. 1 illustrates a system for dynamic log management of stream processing in a distributed environment, in accordance with an embodiment.

As described above, distributed computing environments, such as, for example, streaming application or stream analytics systems, enable large amounts of data to be processed as streams, which can then be analyzed to provide useful information. Such systems provide a platform for business users to design, validate, and deploy streaming software applications (streaming applications), to meet their business needs.

A typical stream analytics system comprises multiple processing instances, running over multiple hosts or nodes. Stream processing components, such as, for example, Apache Spark (Spark) transformations or Cassandra Query Language (CQL) engines, can generate processing logs on those nodes, for use in monitoring the health of the streaming applications.

Examples of stream analytics systems include Oracle Stream Analytics (OSA), which provides an in-memory computational environment for real-time analytic computations on streaming data, integrates with computing environments such as Spark for data processing, and Apache Hadoop YARN for job scheduling and cluster resource management, and enables features such as execution of queries against event streams in real time.

In accordance with various embodiments, the systems and methods described herein can be used with other types of stream analytics systems or distributed computing environments.

Since a streaming application is often designed to run continuously, i.e., on a 24×7 basis, the processing logs that are generated at the nodes are typically configured to record only important warning/error messages, or a reduced set of information log messages, to improve system performance and reduce space requirements. However, when the system encounters frequent warnings/errors, there may be a need to diagnose an underlying or root cause associated with those warnings/errors.

In such situations, it may be helpful to generate lower-level log messages associated with the streaming application, such as, for example, info, debug, or trace messages, for a particular period of time, without stopping or otherwise disrupting the running application.

In accordance with an embodiment, described herein is a system and method for dynamic log management of stream processing in a distributed computing environment, such as, for example, a streaming application or stream analytics system.

A streaming application can be deployed or published to a cluster, to execute as a client application. A cluster manager coordinates with worker nodes, to commit tasks associated with the streaming application.

If a need arises to generate lower-level log data associated with the streaming application, for example to diagnose an underlying cause of a warning/error message, a configuration job can be committed to the cluster to execute as a separate log-configuration application.

The log-configuration application operates with the cluster manager to determine the set of working nodes currently associated with the streaming application, and modify the logger configuration at those nodes, to record or otherwise provide log data according to a modified logging level, for example to provide lower-level log messages.

In accordance with various embodiments, a technical purpose of the systems and methods described herein includes the generation of lower-level log data associated with a streaming application or stream analytics system. The system can automatically determine, based on an application context, a set of working nodes that are currently associated with the streaming application, and dynamically modify the logger configuration associated with those nodes, for a particular period of time, without stopping or otherwise disrupting the running application.

Dynamic Log Management of Stream Processing

FIG. 1 illustrates a system for dynamic log management of stream processing in a distributed environment, in accordance with an embodiment.

As illustrated in FIG. 1, in accordance with an embodiment, a stream analytics environment 100 enables a streaming application 102 that includes an application processing logic or pipeline, to be deployed or otherwise published to a cluster environment 104, such as, for example, a Spark cluster, or other type of distributed computing environment, where the streaming application executes as a client application.

In accordance with an embodiment, the cluster can include a master node operating as a cluster manager 110 that coordinates with a plurality of worker nodes 120, 122, 124, 126, 128, 130, to commit tasks associated with the streaming application, so that those tasks can be processed by one or more of the worker nodes.

For example, in an Oracle Stream Analytics (OSA) environment, the streaming application can be deployed or otherwise published to a cluster environment that includes Spark for data processing, and YARN for job scheduling and cluster resource management.

Depending on the particular cluster environment, the master node may, for example, be a regular node within the cluster that is selected to operate as the cluster manager.

Figure 2:
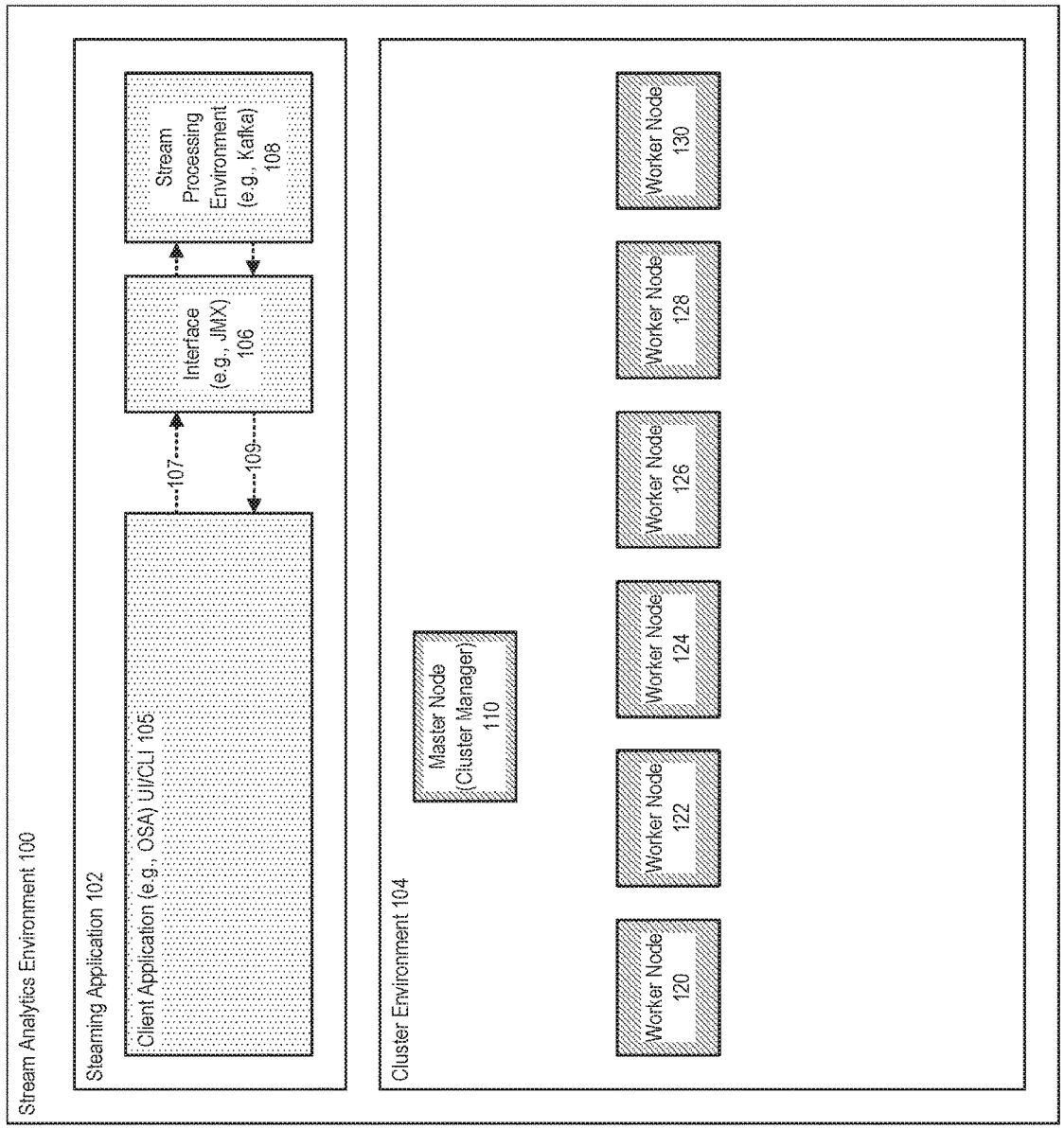
FIG. 2 further illustrates a system for dynamic log management of stream processing in a distributed environment, in accordance with an embodiment.

FIG. 2 further illustrates a system for dynamic log management of stream processing in a distributed environment, in accordance with an embodiment.

As illustrated in FIG. 2, in accordance with an embodiment, the streaming application can be associated with a client application user interface (UI)/command line interface (CLI) 105, such as, for example, an OSA interface, that enables a user to configure or otherwise interact with the streaming application.

Additionally, in accordance with an embodiment, the streaming application can communicate 107, 109, via an interface 106, for example a Java Management Extensions (JMX), with a stream processing environment 108, such as, for example, an Apache Kafka (Kafka) environment, that the streaming application can use to set and to receive job information associated with the streaming application.

Figure 3:
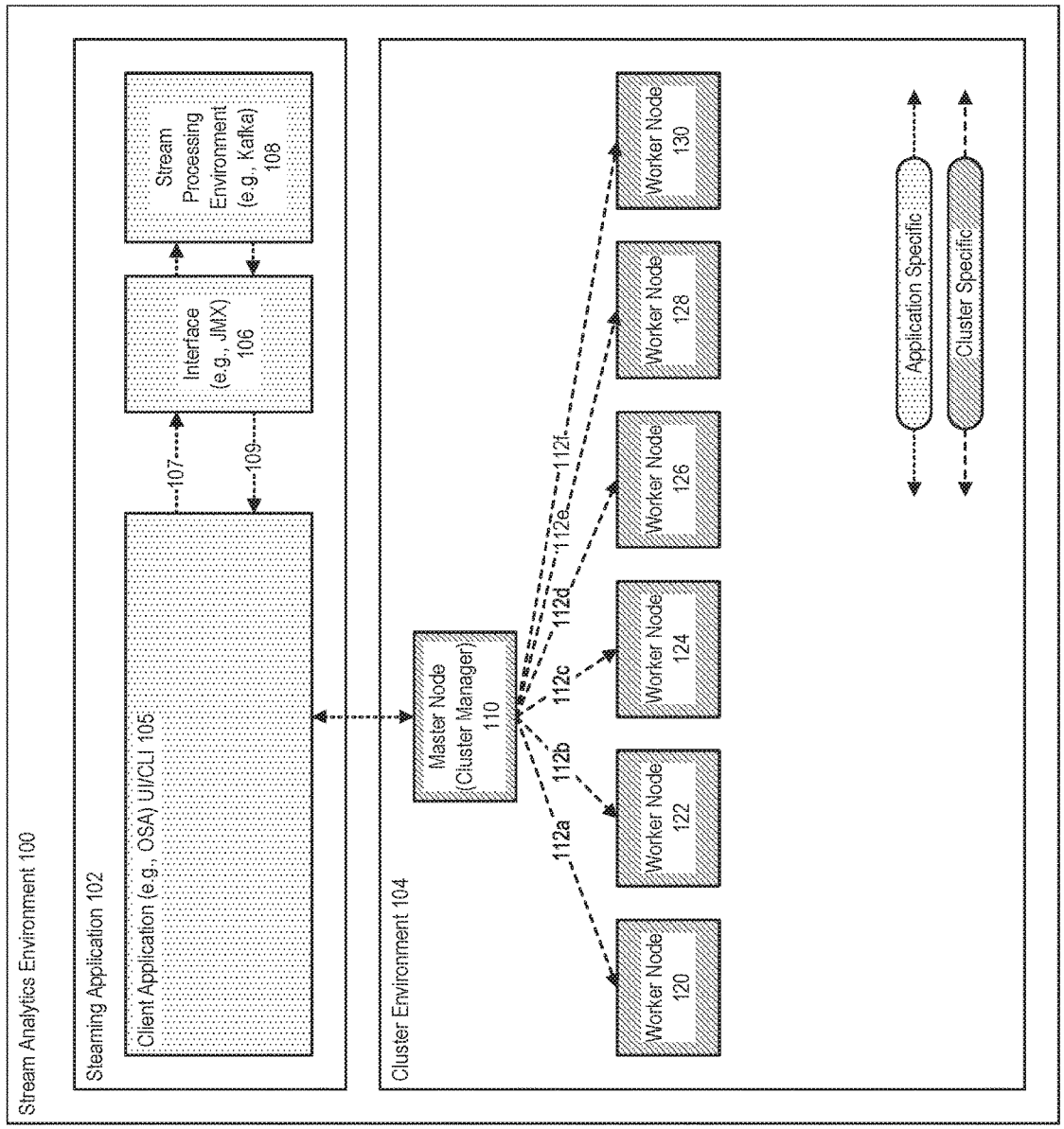
FIG. 3 further illustrates a system for dynamic log management of stream processing in a distributed environment, in accordance with an embodiment.

FIG. 3 further illustrates a system for dynamic log management of stream processing in a distributed environment, in accordance with an embodiment.

As illustrated in FIG. 3, in accordance with an embodiment, the streaming application can be deployed or otherwise published to the cluster, so that the cluster manager can direct (112a-112f) the application to operate or execute at one or more worker nodes.

Figure 4:
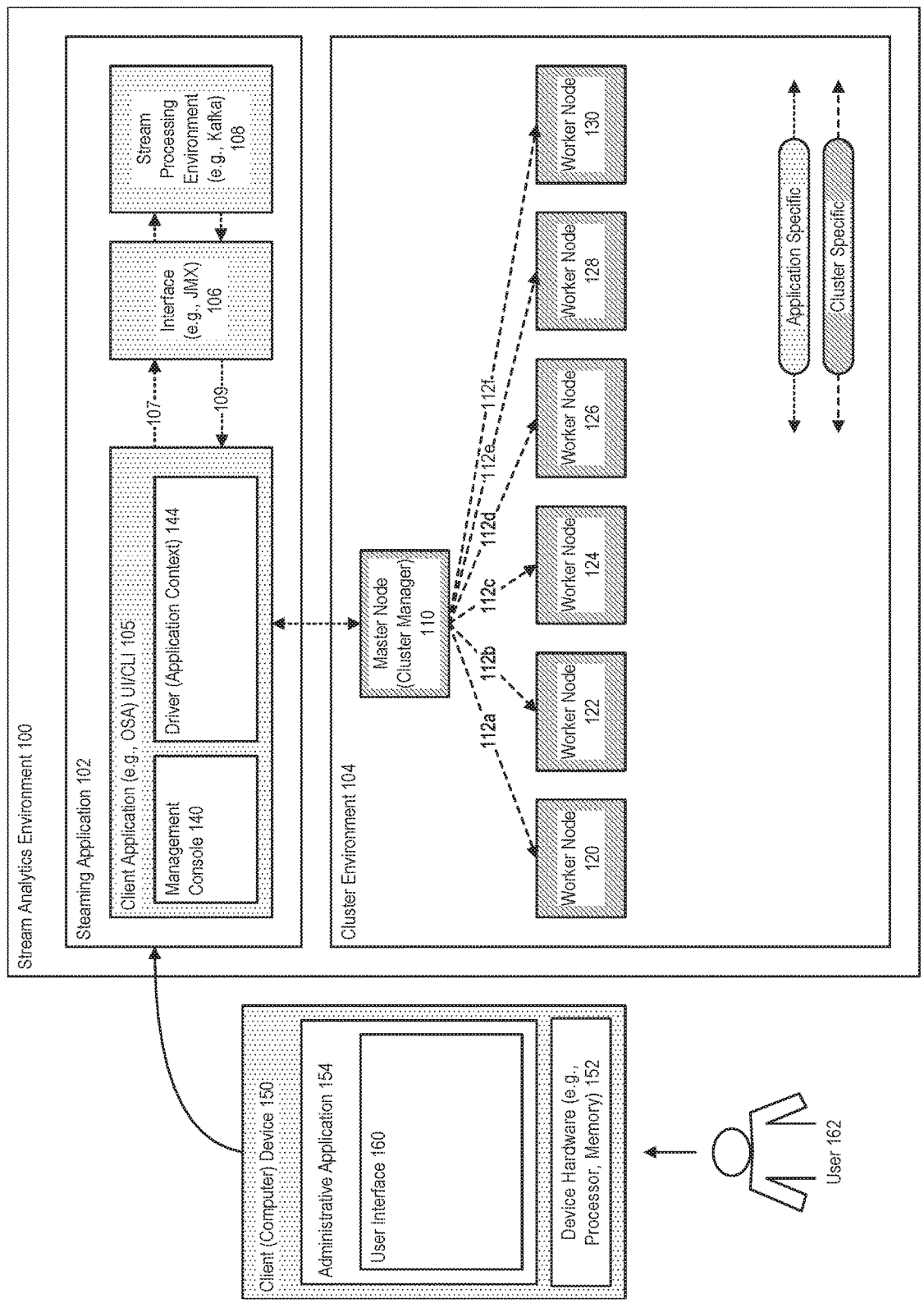
FIG. 4 further illustrates a system for dynamic log management of stream processing in a distributed environment, in accordance with an embodiment.

FIG. 4 further illustrates a system for dynamic log management of stream processing in a distributed environment, in accordance with an embodiment.

As illustrated in FIG. 4, in accordance with an embodiment, the streaming application can be associated with a management console 140 that enables management of the streaming application, and a driver (application context) 144 that enables interaction by the streaming application with the cluster environment and the cluster manager to direct the application to operate or execute at the one or more worker nodes.

As also illustrated in FIG. 4, in accordance with an embodiment, a client (computer) device 150, including device hardware 152 (e.g., processor, memory), administrative application 154, and user interface 160, enables a user 162 to interact with the streaming application, including for example as described below to set configuration logging levels, or receive log messages.

Figure 5:
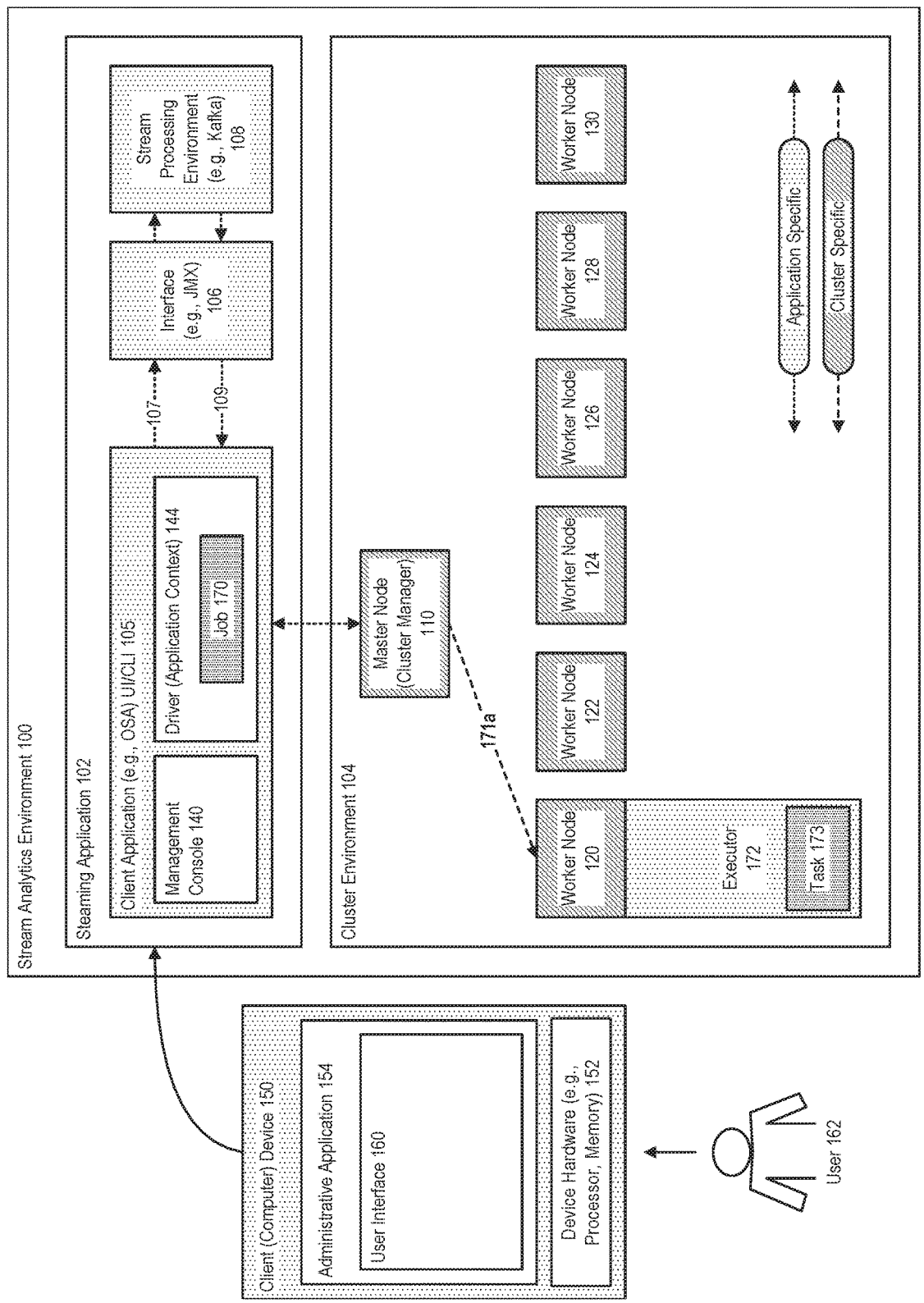
FIG. 5 further illustrates a system for dynamic log management of stream processing in a distributed environment, in accordance with an embodiment.

FIG. 5 further illustrates a system for dynamic log management of stream processing in a distributed environment, in accordance with an embodiment.

As illustrated in FIG. 5, in accordance with an embodiment, while the streaming application executes, and processes a job 170 as part of its execution, the driver operates with the cluster manager to determine (171a-171b) an executor 172 on one or more worker nodes (e.g., in this example worker node 120) to commit one or more tasks 173 associated with the streaming application, to be processed by those one or more worker nodes.

Figure 6:
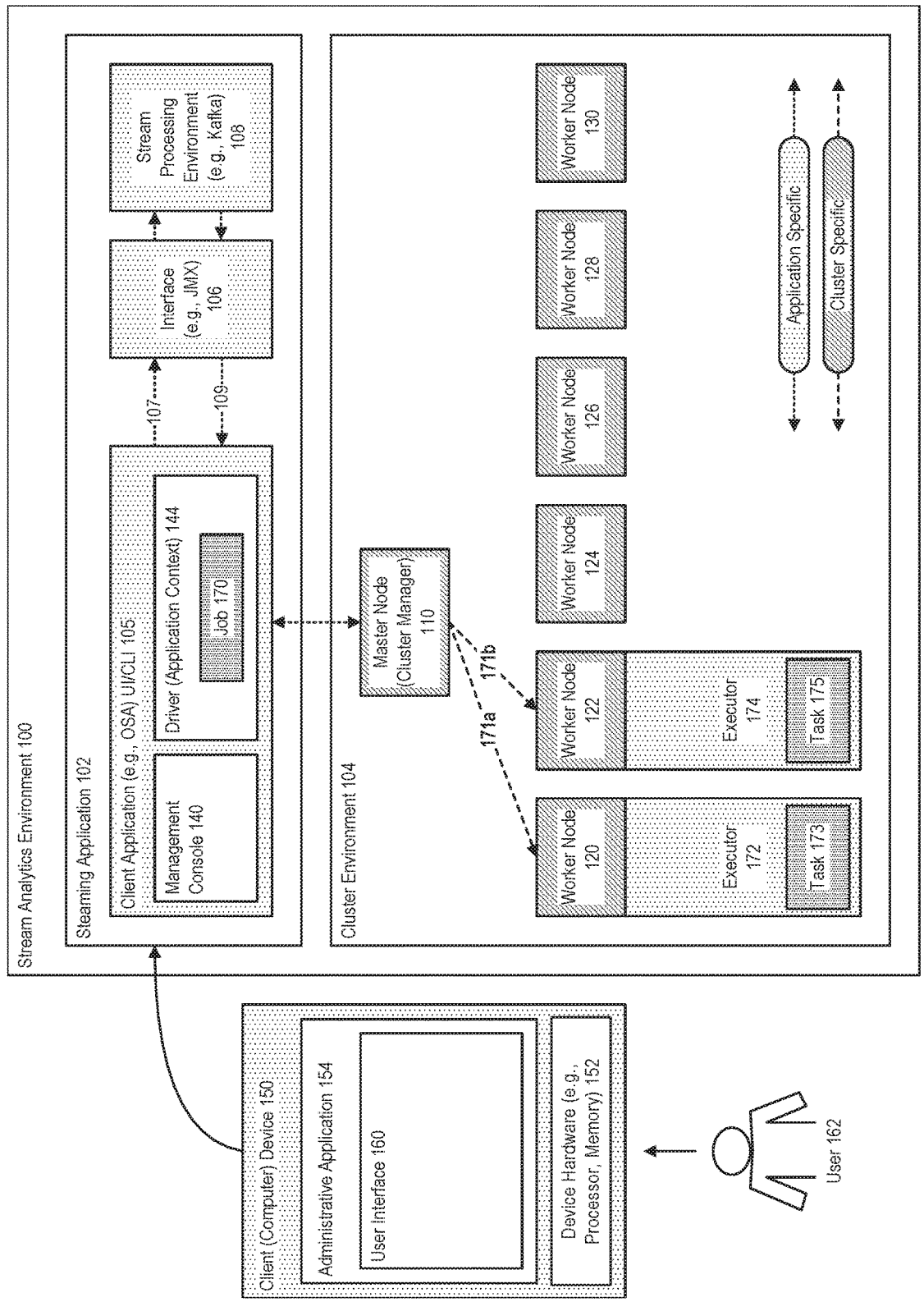
FIG. 6 further illustrates a system for dynamic log management of stream processing in a distributed environment, in accordance with an embodiment.

FIG. 6 further illustrates a system for dynamic log management of stream processing in a distributed environment, in accordance with an embodiment.

As illustrated in FIG. 6, in accordance with an embodiment, each of one or more other worker nodes (e.g., in this example worker node 122) can similarly include an executor 174 that receives and processes one or more tasks 175 associated with the streaming application and the (processing) job.

Figure 7:
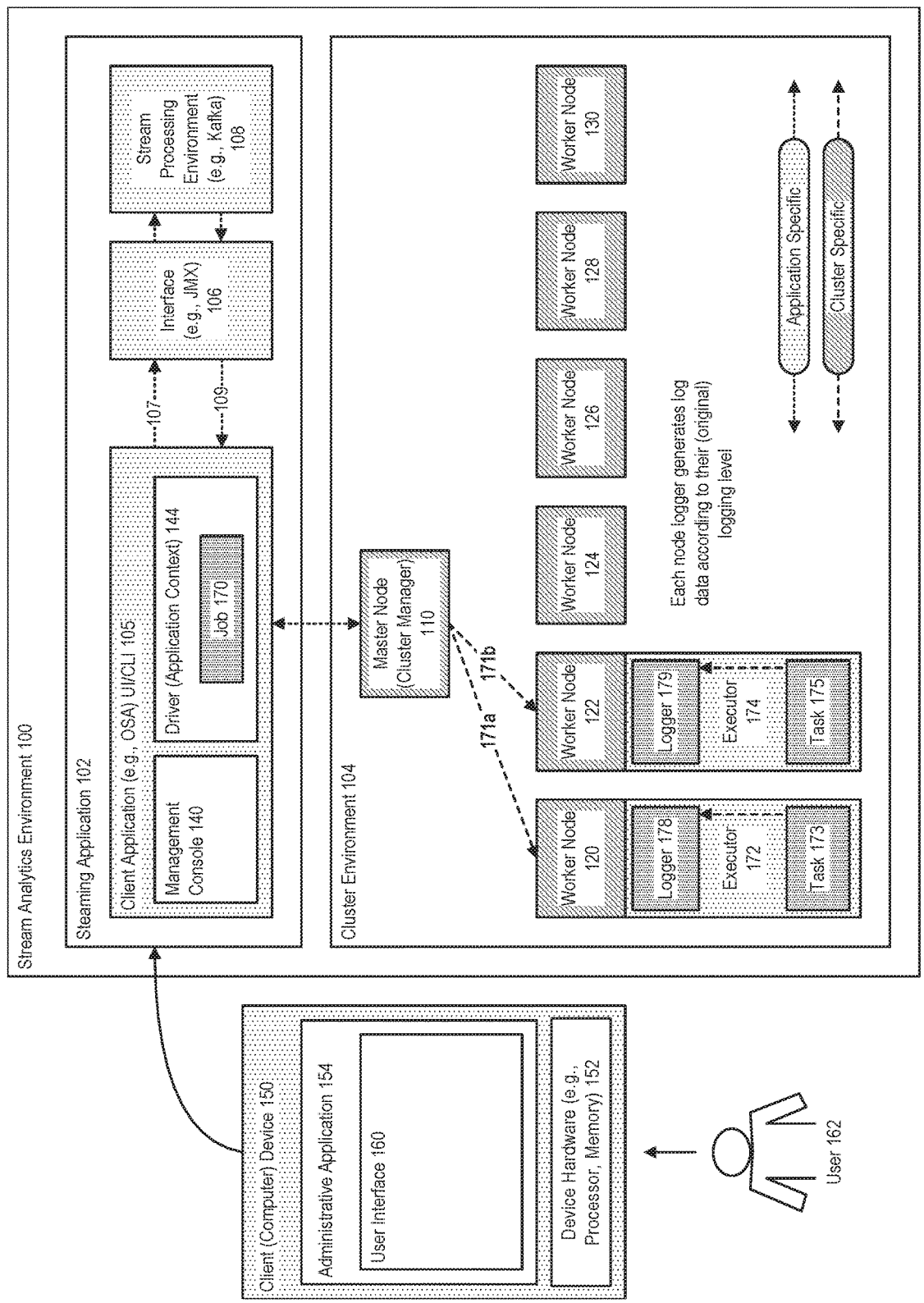
FIG. 7 further illustrates a system for dynamic log management of stream processing in a distributed environment, in accordance with an embodiment.

FIG. 7 further illustrates a system for dynamic log management of stream processing in a distributed environment, in accordance with an embodiment.

As illustrated in FIG. 7, in accordance with an embodiment, each of the set of worker nodes operating with the streaming application can be associated with a logger 178, 179, to perform logging associated with the processing of those tasks.

In the example illustrated in FIG. 7, each node logger generates log data according to their (original) logging level.

Figure 8:
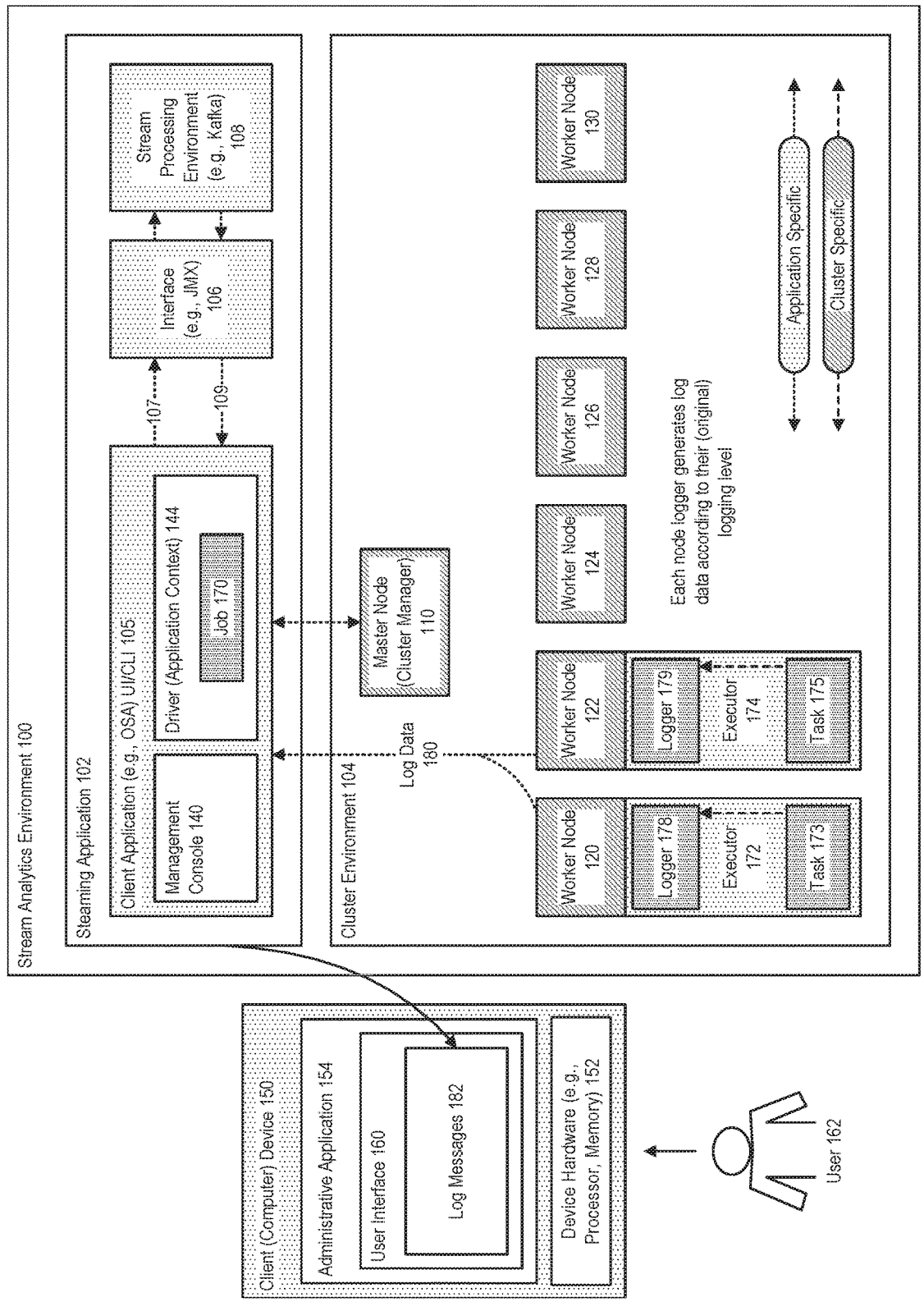
FIG. 8 further illustrates a system for dynamic log management of stream processing in a distributed environment, in accordance with an embodiment.

FIG. 8 further illustrates a system for dynamic log management of stream processing in a distributed environment, in accordance with an embodiment.

As illustrated in FIG. 8, in accordance with an embodiment, the log data 180 generated by the loggers at the various set of nodes, can be communicated by the cluster nodes to the streaming application environment, where it can then be accessed by the user, e.g., as a plurality of log messages 182.

Modification of Logging Levels

As described above, in certain situations, it may be helpful to generate lower-level log messages associated with the streaming application, such as, for example, info, debug, or trace messages, for a particular period of time, without stopping or otherwise disrupting the running application.

In accordance with an embodiment, If a need arises to generate lower-level log data associated with the streaming application, for example to diagnose an underlying cause of a warning/error message, a configuration job can be committed to the cluster to execute as a separate log-configuration application.

In accordance with an embodiment, the log-configuration application operates with the cluster manager to determine the set of working nodes currently associated with the streaming application, and modify the logger configuration at those nodes, to record or otherwise provide log data according to a modified logging level, for example to provide lower-level log messages.

Figure 9:
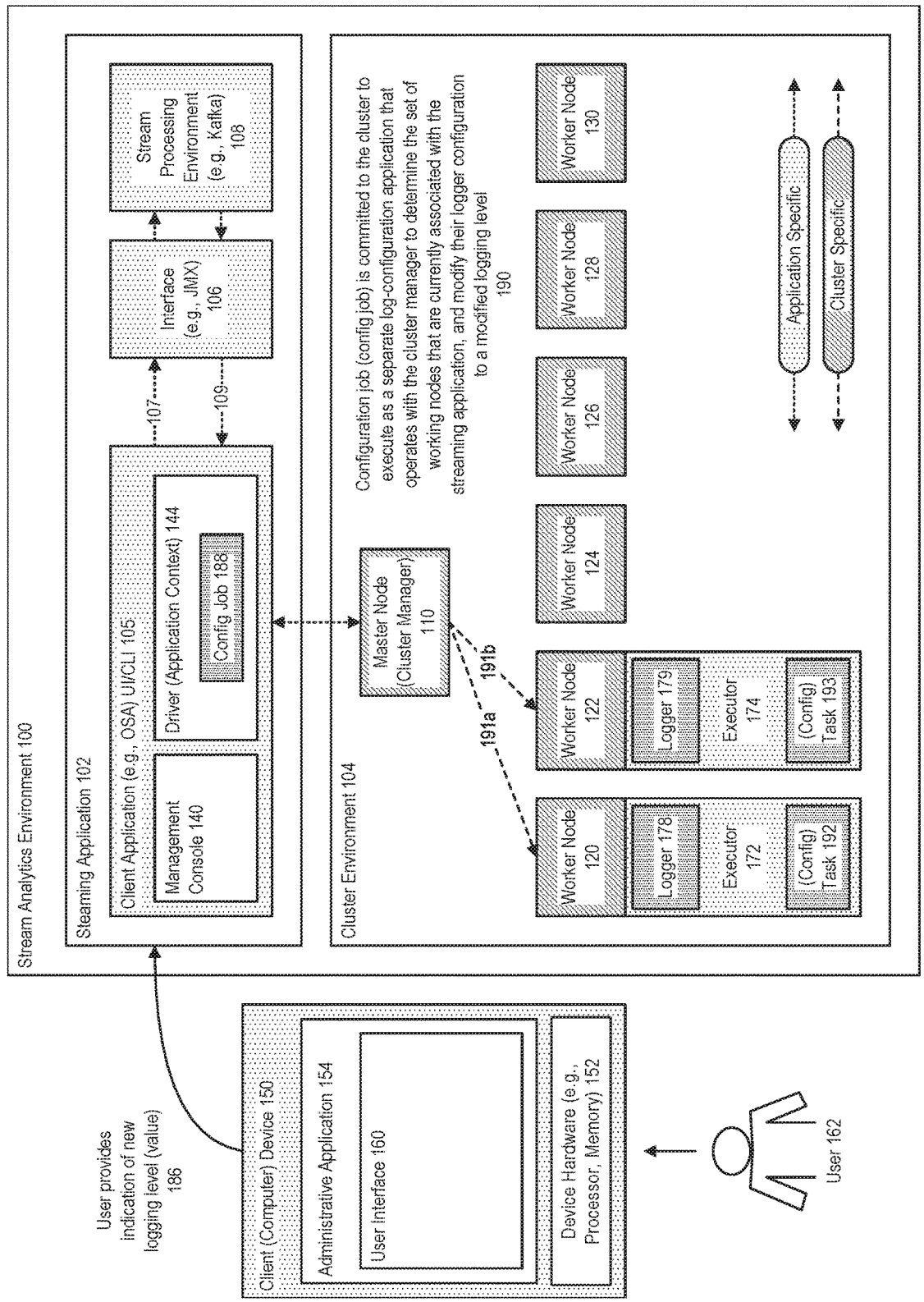
FIG. 9 further illustrates a system for dynamic log management of stream processing in a distributed environment, in accordance with an embodiment.

FIG. 9 further illustrates a system for dynamic log management of stream processing in a distributed environment, in accordance with an embodiment.

As illustrated in FIG. 9, in accordance with an embodiment, a user can provide indication of a new logging level (value) 186, for example via the user interface, as further illustrated and described below.

In accordance with an embodiment, in response to receiving the indication of the new logging level, a configuration job 188 can be committed to the cluster to execute as a separate log-configuration application. The log-configuration application operates 190 with the cluster manager to determine (191a-191b) the set of working nodes that are currently associated with the streaming application, and then executes (configuration) tasks 192, 193, at those working nodes, using the same process by which the streaming application submits streaming data for processing.

For example, in accordance with an embodiment, as part of executing tasks for the streaming application, the driver registers managed beans (MBeans) to enable the application to run processing jobs on a set of worker nodes. To execute (configuration) tasks at the set of working nodes, the driver can use the registered MBeans, and generate a configuration job for the application and submit that job to the cluster manager.

For example, in accordance with an embodiment, the configuration can be published to an, e.g., Kafka topic, or passed as a parameter of a remote JMX MBean (of the driver) invocation. The driver can then subscribe to the, e.g., Kafka topic, and consume the configuration or receive the configuration via the JMX Mbean, and create a log configuration job using the updated configuration and cluster manager to fetch the running process/executors for the streaming application.

In accordance with an embodiment, the (configuration) tasks include new log configuration values for various components of the distributed computing environment, and when processed at a node modify the logger configuration at those nodes, to record or otherwise provide log data according to a modified logging level.

Figure 10:
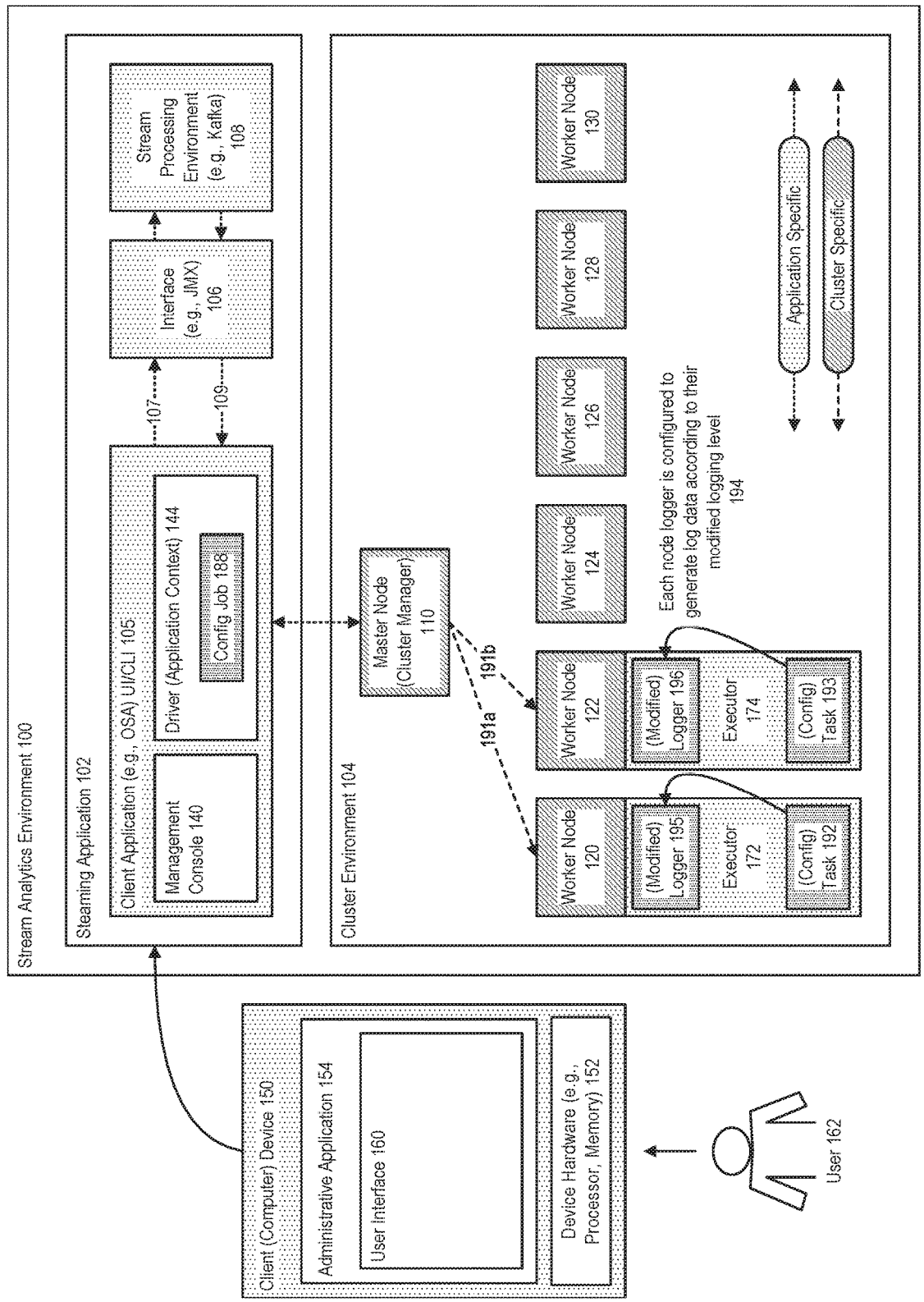
FIG. 10 further illustrates a system for dynamic log management of stream processing in a distributed environment, in accordance with an embodiment.

FIG. 10 further illustrates a system for dynamic log management of stream processing in a distributed environment, in accordance with an embodiment.

As illustrated in FIG. 10, in accordance with an embodiment, each node logger is configured to generate log data according to their modified logging level 194, so that the loggers at each of the set of worker nodes operating with the streaming application operate as (modified) loggers 195, 196, to perform logging according to the modified logging level.

For example, in accordance with an embodiment, if a user interacting with the user information specifies a new value for logging level, the system can commit a corresponding configuration job to be executed within the cluster as a separate log-configuration application, which communicates with the cluster manager to determine the set of working nodes that are currently associated with the streaming application (e.g., nodes 120, 122), and dynamically modify the logger configuration of each of the set of working nodes, to record or otherwise provide log data according to a modified logging level.

In accordance with an embodiment, the next processing batch by the streaming application within the distributed computing environment accepts and performs according to the new logger configuration. Once set using the above approach, the logger configuration remains in place until the configuration changes again.

Figure 11:
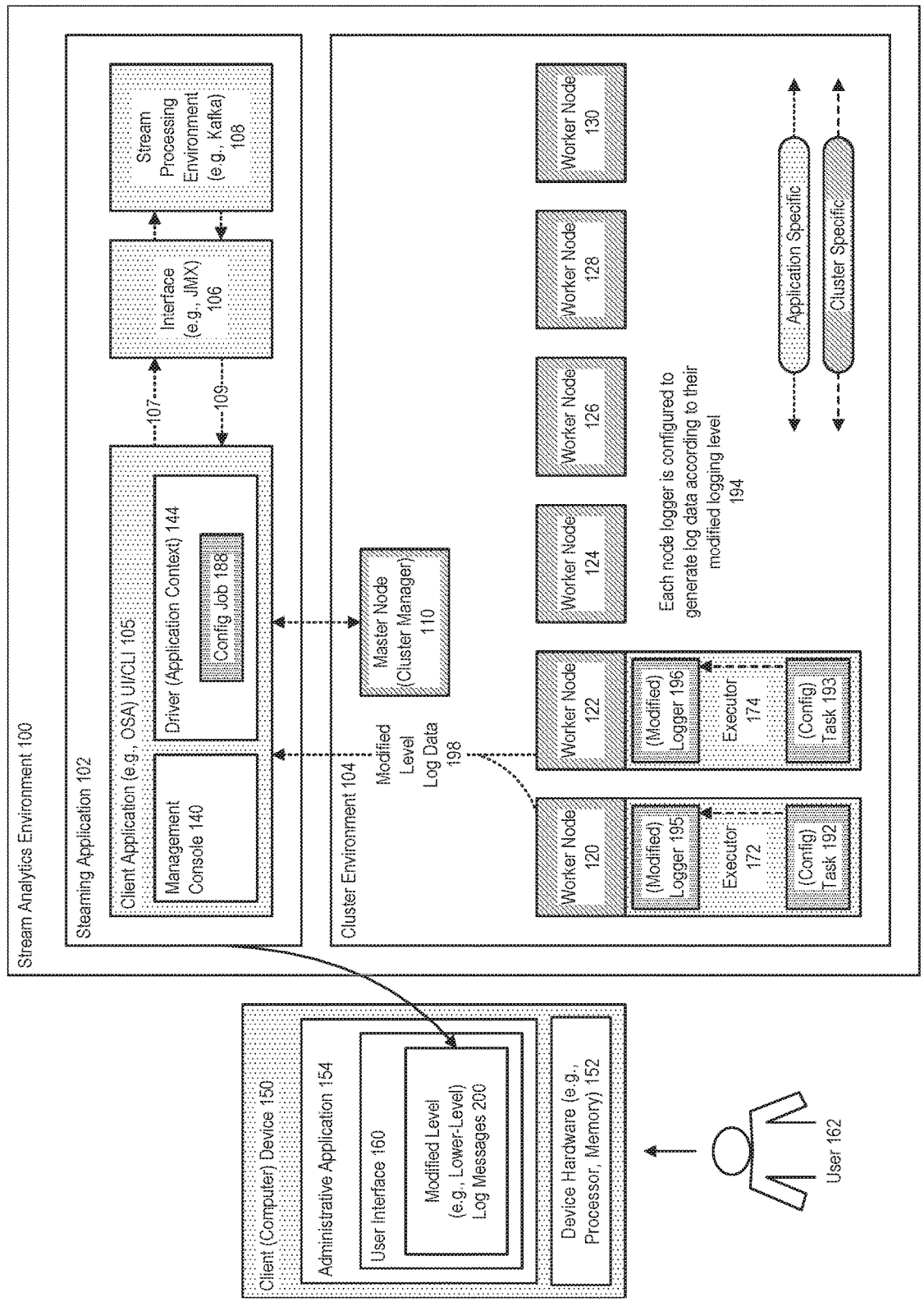
FIG. 11 further illustrates a system for dynamic log management of stream processing in a distributed environment, in accordance with an embodiment.

FIG. 11 further illustrates a system for dynamic log management of stream processing in a distributed environment, in accordance with an embodiment.

As illustrated in FIG. 11, in accordance with an embodiment, the change in logging level causes the log data 198 generated by the loggers at the various set of nodes, to be generated according to the modified logging level, and communicated by the cluster nodes to the streaming application environment, where it can then be accessed by the user, e.g., as modified level (e.g., lower-level) log messages 200.

In accordance with an embodiment, since the distributed computing environment and its worker nodes can change dynamically, the system can, as part of executing the configuration job, record within the application context information as to which of the worker nodes have had the logger configuration at those nodes modified. Such recorded information can be used in tracking information received from the various worker nodes, for example to explain why a first worker node may be logging data, while a second (e.g., new) worker node may not.

Figure 12:
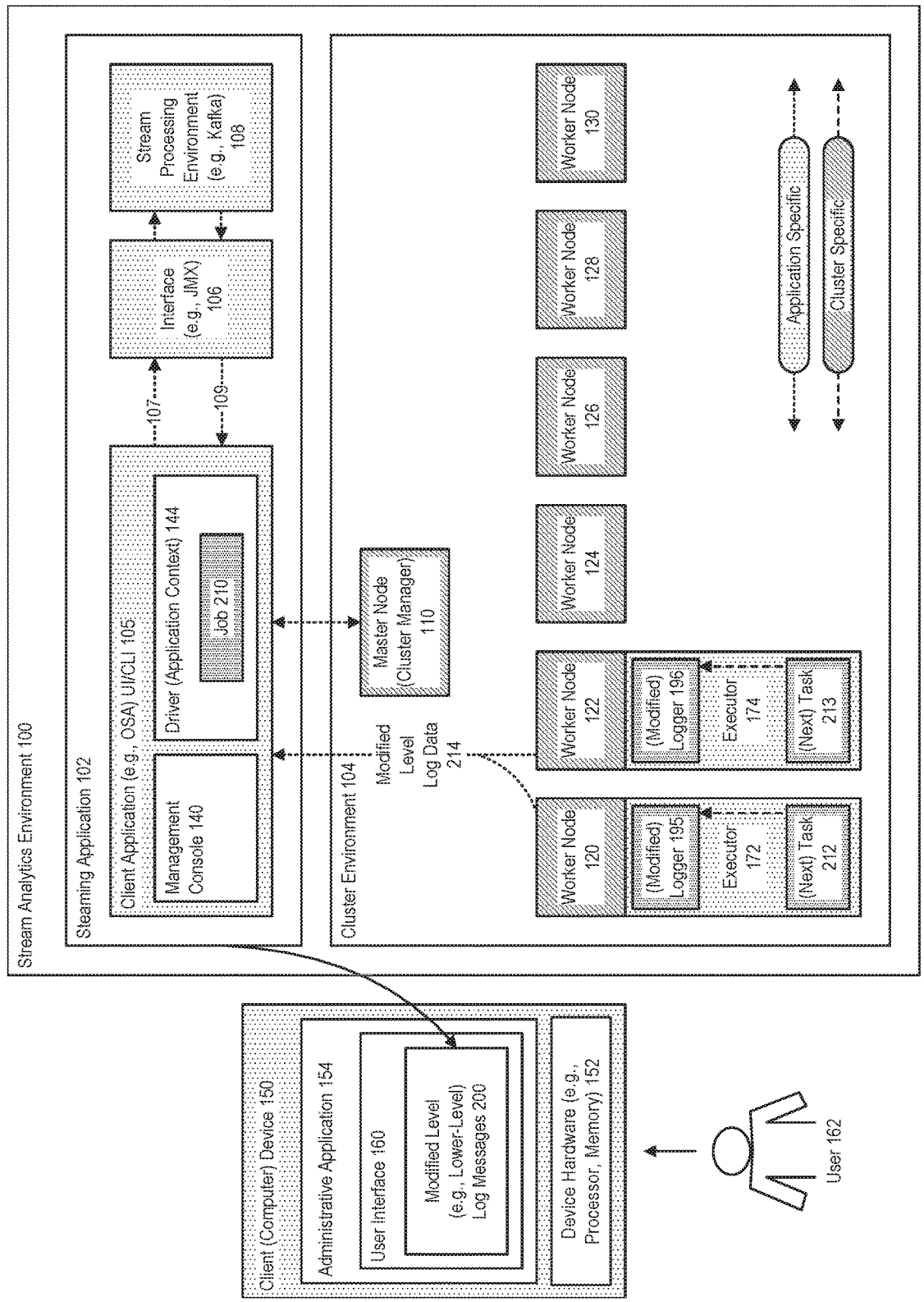
FIG. 12 further illustrates a system for dynamic log management of stream processing in a distributed environment, in accordance with an embodiment.

FIG. 12 further illustrates a system for dynamic log management of stream processing in a distributed environment, in accordance with an embodiment.

As illustrated in FIG. 12, in accordance with an embodiment, a next (processing) job 210 associated with the streaming application, including new tasks 212, 213 being processed by the set of worker nodes, will be logged according to the new logging level and generate the modified level log data 214.

In accordance with an embodiment, the various components or processes described above can be provided as software or program code executable by a computer system or other type of processing device.

In accordance with an embodiment, a user can provide indication of a new logging level (value), for example via a user interface which in turn uses, e.g., JMX, or Kafka messaging, to initiate the creation of a task to the master node operating as a cluster manager.

For example, in accordance with an embodiment, the master node operating as a cluster manager may be the driver of a Spark application. In such an embodiment, the master node can then submit the task to all of the processing nodes, which affects all of the stream processing components running on these processing nodes, to generate the logs as indicated by their new logger configuration.

As described above, since a typical streaming application is designed to run continuously on a 24×7 basis, in accordance with various embodiments, the systems and methods described herein enable the generation of lower-level log data associated with a streaming application or stream analytics system, such as, for example, info, debug, or trace messages, for a particular period of time, without stopping or otherwise disrupting the running application.

Example Execution Flow

Figure 13:
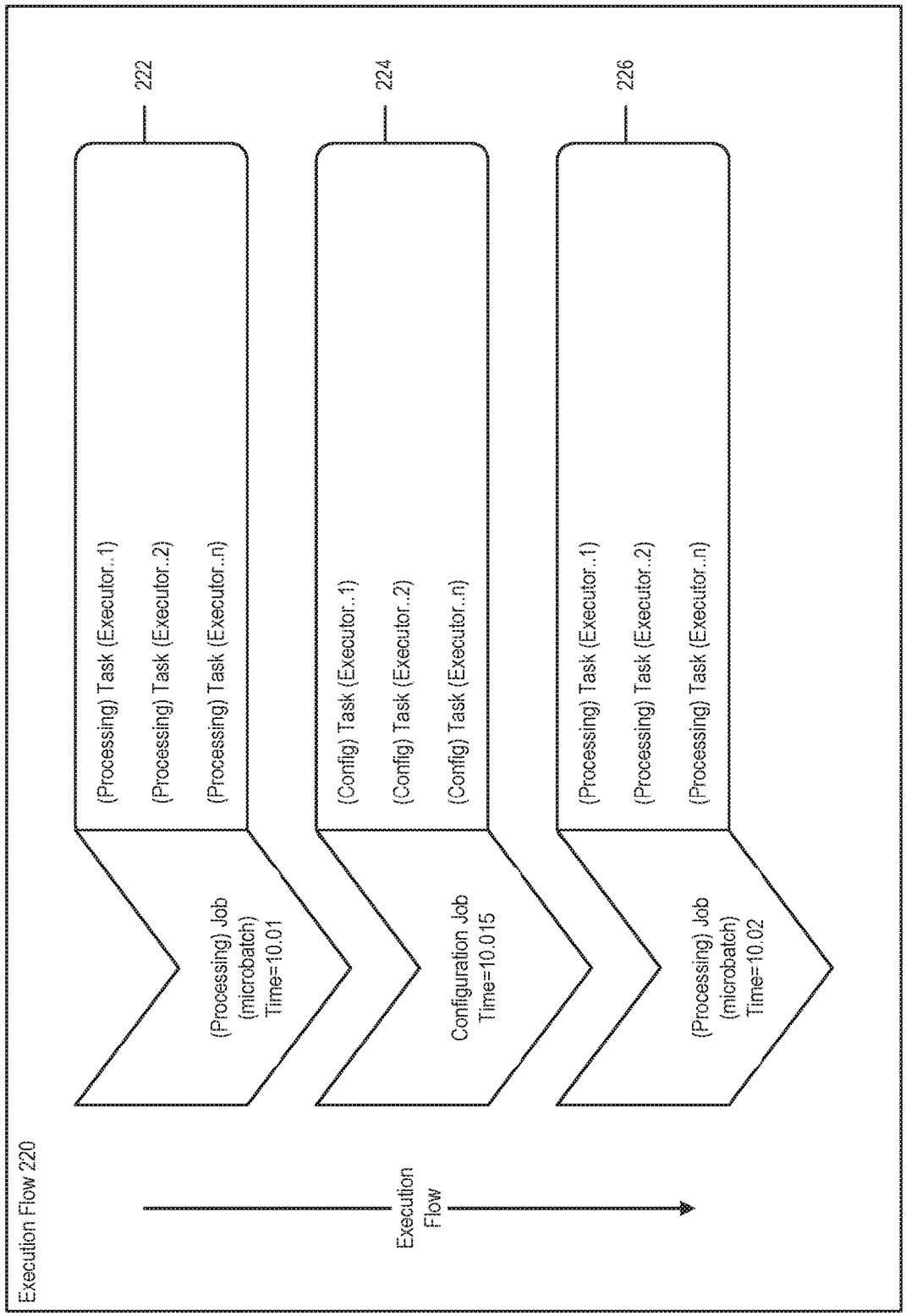
FIG. 13 illustrates an execution flow for dynamic log management of stream processing in a distributed environment, in accordance with an embodiment.

FIG. 13 illustrates an execution flow 220 for dynamic log management of stream processing in a distributed environment, in accordance with an embodiment As illustrated in FIG. 13, in accordance with an embodiment, a (configuration) task including new log configuration values can be submitted to a stream processing node using the same process by which the streaming application submits streaming data for processing.

For example, in accordance with an embodiment, at a first time (222), illustrated here as 10.01, the node can execute a first micro-batch of data processing.

Then, at a next or second time (224), illustrated here as 10.015, the node can execute the log (configuration) task as a micro-batch.

Then, at a next or third time (226), illustrated here as 10.02, the node can execute a second micro-batch of data processing.

Figure 14:
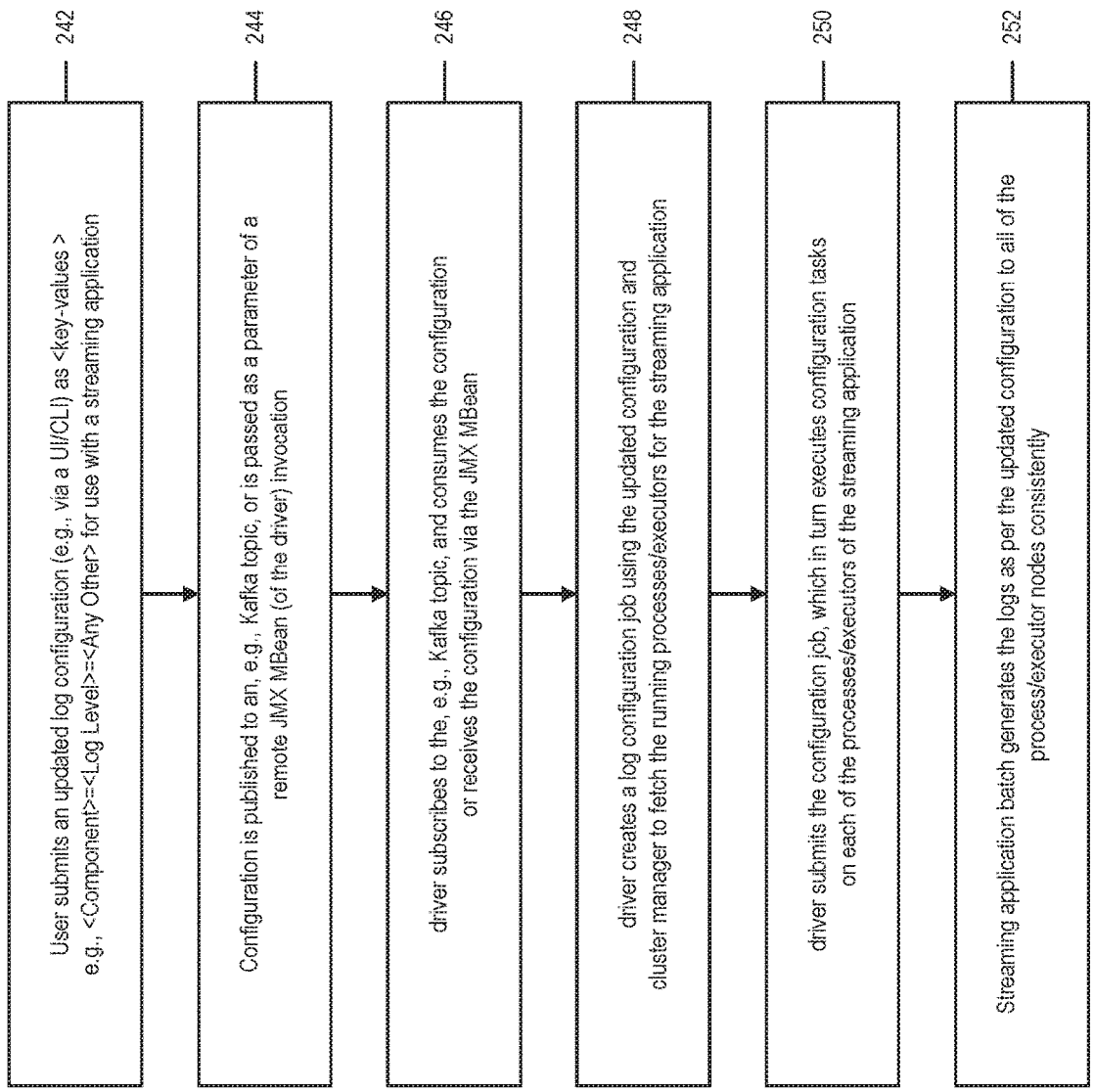
FIG. 14 illustrates a flowchart of a process for dynamic log management of stream processing in a distributed environment, in accordance with an embodiment.

FIG. 14 illustrates a flowchart of a process for dynamic log management of stream processing in a distributed environment, in accordance with an embodiment.

As illustrated in FIG. 14, in accordance with an embodiment, at a first step 242, an end user submits the updated log configuration (e.g., via a UI/CLI) as <key-values>e.g., <Component>=<Log Level>=<Any Other> for use with a streaming application.

At step 244, the configuration is published to an, e.g., Kafka topic, or is passed as a parameter of a remote JMX MBean (of the driver) invocation.

At step 246, the driver subscribes to the, e.g., Kafka topic, and consumes the configuration or receives the configuration via the JMX Mbean.

At step 248, the driver creates a log configuration job using the updated configuration and cluster manager to fetch the running process/executors for the streaming application.

At step 250, the driver submits the configuration job, which in turn executes configuration tasks on each of the processes/executors of the streaming application.

At step 252, the streaming application batch generates the logs as per the updated configuration to all the processer/executors node consistently.

Logging Framework

In accordance with an embodiment such as, for example, an environment that uses Oracle Stream Analytics (OSA) for stream analytics, the system can use an Apache Log4j framework for logging, for example to implement a common logger API and to define and initialize default log configuration for streaming applications.

Logger API

In accordance with an embodiment, the logging framework can include a generic logger API that can be used by stream analytics components to log messages in a consistent and well-defined format, including, for example, enabling modules to log messages with product, application, and component level details. The logger API can be implemented in a logger module (spark-cql), based on the Log4j framework, and delegate calls to a Log4j logger. Listing 1 illustrates an example set of instructions to create and use the logger API, in accordance with an embodiment.

Listing 1

```
usage
import com.oracle.osa.logger.Logger;
import com.oracle.osa.logger.LoggerFactory;
//get logger
private static Logger logger = LoggerFactory.getLogger(<class>);
//log info message
logger.info("info message" );
//log info message with additional module attribute
logger.info(new LogAttr( ).module("runtime"), "info message");
//log warnings
logger.warn("warning message");
logger.warn("warning message", exception);
//log a warning message for customer
logger.warn(new LogAttr( ).loggerType(LoggerType.CUSTOMER( )),
"{warning message to customer,Cause:warn cause,Action:action reqd}")
or
logger.warn(LoggerType.CUSTOMER, exception)
//log error
logger.warn("error message");
logger.warn("error message", exception);
```

Log Configuration

In accordance with an embodiment, a log configuration needs to be configured properly for a streaming application, some examples of which configuration are described below.

Log Destination

In accordance with an embodiment, this is the location to send logs generated by the application, for example, a console, file, Kafka topic. There are two log destination supported by the default configuration:

Standard error (stderr)—this is the default Spark streaming log destination, which creates stderr file under <SPARK_HOME>/work/<appid>/stderr, this is used to display the log message on Spark UI.

Kafka topic—this destination can be used to log and display the log message on, e.g., an Oracle Stream Analytics (OSA) user interface associated with a pipeline.

Log Archive (Rotation and Retention Policy)

In accordance with an embodiment, the system can be configured to manage a log file (sink) which is continuously growing, for example by defining a rotation and retention policy.

Logging Levels

In accordance with an embodiment, different logging levels (e.g., "DEBUG", "INFO", "WARN", "ERROR", "FATAL") can be supported, for example a log message type that an application generates, and what should be mapped to the different log destination.

By default, log messages with a particular logging level, e.g., "INFO" and above, are communicated to stderr (default destination), and log messages with a logging level, e.g., "WARN" and above, are communicated to the Kafka topic.

Log Message Layout

In accordance with an embodiment, the system can use a storage format (e.g., json, csv, tsv) in which log message will be sent to the log destination.

In accordance with an embodiment such as, for example, an environment that uses Oracle Stream Analytics (OSA) for stream analytics, by default, the log messages are sent in json format to the stderr and Kafka topic destination.

Listing 2 illustrates an example log message associated with such an environment, corresponding to a pipeline, in accordance with an embodiment.

Listing 2

```
{"Timestamp":"2017-11-07 09:57:09,965",
"Pipeline ID":"BCB3FC68-95B8-477E-8941-BF011579C5E1",
"Pipeline Name":"NanoApp",
"Component ID":"OSA",
"Module":"",
"Instance ID":"kkm00cxv.in.oracle.com",
"User ID":"",
"Message Type":"INFO",
"Message Text":"Spark application context initialized:
SparkApplicationContext[batchDuration=1000|defaultPartitionCount=1]"
"Supplemental Attributes":"{"Thread":"main","class":"StreamingEngineImpl"}",
"Supplemental Detail":"{"stacktrace":""}"}
{"Timestamp":"2017-11-07 09:57:10,375",
"Pipeline ID":"BCB3FC68-95B8-477E-8941-BF011579C5E1",
"Pipeline Name":"NanoApp",
"Component ID":"OSA",
"Module":"",
"Instance ID":"kkm00cxv.in.oracle.com",
"User ID":"",
"Message Type":"INFO",
"Message Text":"Creating Kafka topic:
sx_NanoApp_BCB3FC68_95B8_477E_8941_BF011579C5E1_mTh_draft_st5FB6FA13-F389-
4E21-B1E7-CAEF5F7EA822 with partition: 1, replication: 1"
"Supplemental Attributes":"{"Thread":"main","class":"KafkaClientImpl"}",
"Supplemental Detail":"{"stacktrace":""}"}
{"Timestamp":"2017-11-07 09:57:10,935",
"Pipeline ID":"BCB3FC68-95B8-477E-8941-BF011579C5E1",
"Pipeline Name":"NanoApp",
"Component ID":"OSA",
"Module":"",
"Instance ID":"kkm00cxv.in.oracle.com",
"User ID":"",
"Message Type":"INFO",
"Message Text":"Topic creation {"version":1,"partitions":{"0":[1001]}}"
"Supplemental Attributes":"{"Thread":"main","class":"AdminUtils$"}",
"Supplemental Detail":"{"stacktrace":""}"}
{"Timestamp":"2017-11-07 09:57:10,942",
"Pipeline ID":"BCB3FC68-95B8-477E-8941-BF011579C5E1",
"Pipeline Name":"NanoApp",
"Component ID":"OSA",
"Module":"",
"Instance ID":"kkm00cxv.in.oracle.com",
"User ID":"",
"Message Type":"INFO",
```

Listing 2

"Message Text":"Creating Kafka topic - done:
sx__NanoApp__BCB3FC68__95B8__477E__8941__BF011579C5E1__mTh__draft__st5FB6FA13-F389-
4E21-B1E7-CAEF5F7EA822"
"Supplemental Attributes":"{"Thread":"main","class":"KafkaClientImpl"}",
"Supplemental Detail":"{"stacktrace":""}"}
{"Timestamp":"2017-11-07 09:57:13,574",
"Pipeline ID":"BCB3FC68-95B8-477E-8941-BF011579C5E1",
"Pipeline Name":"NanoApp",
"Component ID":"OSA",
"Module":"",
"Instance ID":"kkm00cxv.in.oracle.com",
"User ID":"",
"Message Type":"INFO",
"Message Text":"STARTING CQL CONTEXT ....."
"Supplemental Attributes":"{"Thread":"main","class":"StreamingEngineImpl")",
"Supplemental Detail":"{"stacktrace":""}"}
{"Timestamp":"2017-11-07 09:57:13,577",
"Pipeline ID":"BCB3FC68-95B8-477E-8941-BF011579C5E1",
"Pipeline Name":"NanoApp",
"Component ID":"OSA",
"Module":"",
"Instance ID":"kkm00cxv.in.oracle.com",
"User ID":"",
"Message Type":"INFO",
"Message Text":"Not Local : use Dummy SparkJob to avoid all cqlengine to be
scheduled on the same node"
"Supplemental Attributes":"{"Thread":"main","class":"CQLEngineTracker"}",
"Supplemental Detail":"{"stacktrace":""}"}
{"Timestamp":"2017-11-07 09:57:21,894",
"Pipeline ID":"BCB3FC68-95B8-477E-8941-BF011579C5E1",
"Pipeline Name":"NanoApp",
"Component ID":"OSA",
"Module":"",
"Instance ID":"kkm00cxv.in.oracle.com",
"User ID":"",
"Message Type":"INFO",
"Message Text":"Waiting for 0 cqlengines" "Supplemental
Attributes":"{"Thread":"main","class":"CQLEngineTracker"}", "Supplemental
Detail":"{"stacktrace":""}"}
{"Timestamp":"2017-11-07 09:57:21,898",
"Pipeline ID":"BCB3FC68-95B8-477E-8941-BF011579C5E1",
"Pipeline Name":"NanoApp",
"Component ID":"OSA",
"Module":"",
"Instance ID":"kkm00cxv.in.oracle.com",
"User ID":"",
"Message Type":"INFO",
"Message Text":"0 cqlengines has started"
"Supplemental Attributes":"{"Thread":"main","class":"CQLEngineTracker"}",
"Supplemental Detail":"{"stacktrace":""}"}
{"Timestamp":"2017-11-07 09:57:21,898",
"Pipeline ID":"BCB3FC68-95B8-477E-8941-BF011579C5E1",
"Pipeline Name":"NanoApp",
"Component ID":"OSA",
"Module":"",
"Instance ID":"kkm00cxv.in.oracle.com",
"User ID":"",
"Message Type":"INFO",
"Message Text":"CQLEngineTracker started
endpoint=NettyRpcEndpointRef(spark://CQLEngineTracker@10.196.12.154:17986),1
0.196.12.154:17986"
"Supplemental Attributes":"{"Thread":"main","class":"CQLEngineTracker"}",
"Supplemental Detail":"{"stacktrace":""}"}
{"Timestamp":"2017-11-07 09:57:21,896",
"Pipeline ID":"BCB3FC68-95B8-477E-8941-BF011579C5E1",
"Pipeline Name":"NanoApp",
"Component ID":"OSA",
"Module":"",
"Instance ID":"kkm00cxv.in.oracle.com",
"User ID":"",
"Message Type":"INFO",
"Message Text":"executors collected for 2 seconds"
"Supplemental Attributes":"{"Thread":"dispatcher-event-loop-
0","class":"CQLEngineTracker"}",
"Supplemental Detail":"{"stacktrace":""}"}
{"Timestamp":"2017-11-07 09:57:21,901",
"Pipeline ID":"BCB3FC68-95B8-477E-8941-BF011579C5E1", ---
Listing 2
---

```
"Pipeline Name":"NanoApp",
"Component ID":"OSA",
"Module":"",
"Instance ID":"kkm00cxv.in.oracle.com",
"User ID":"",
"Message Type":"INFO",
"Message Text":""
"Supplemental Attributes":"{"Thread":"dispatcher-event-loop-
0","class":"CQLEngineTracker"}",
"Supplemental Detail":"{"stacktrace":""}"}
{"Timestamp":"2017-11-07 09:57:21,902",
"Pipeline ID":"BCB3FC68-95B8-477E-8941-BF011579C5E1",
"Pipeline Name":"NanoApp",
"Component ID":"OSA",
"Module":"",
"Instance ID":"kkm00cxv.in.oracle.com",
"User ID":"",
"Message Type":"INFO",
"Message Text":"Executors to use for scheduling : executor_10.196.12.154_0"
"Supplemental Attributes":"{"Thread":"dispatcher-event-loop-
0","class":"CQLEngineTracker")",
"Supplemental Detail":"{"stacktrace":""}"}
{"Timestamp":"2017-11-07 09:57:21,902",
"Pipeline ID":"BCB3FC68-95B8-477E-8941-BF011579C5E1",
"Pipeline Name":"NanoApp",
"Component ID":"OSA",
"Module":"",
"Instance ID":"kkm00cxv.in.oracle.com",
"User ID":"",
"Message Type":"INFO",
"Message Text":"configured-noCqlEngines=0, noExecutors=1,
activeCqlEngines=1"
"Supplemental Attributes":"{"Thread":"dispatcher-event-loop-
0","class":"CQLEngineTracker")",
"Supplemental Detail":"{"stacktrace":""}"}
```

Log Configuration Initialization

In accordance with an embodiment, a logging utility, e.g., an implementation of a Log4j Configurator, initializes the log configuration on each, e.g., Spark driver and executor JVMs whenever a pipeline is deployed to the cluster with the default configuration mentioned as above.

Table 1 illustrates a default log configuration in accordance with an embodiment.

TABLE 1

| Destination | Default Logging Level | Logger | Location | Retention |
|---|---|---|---|---|
| Kafka | WARN and above | ALL | Kafka topic | |
| stderr | INFO and above | ALL | Default stderr file under Spark app | |

Example Use Case

In accordance with an embodiment such as, for example, an environment that uses Oracle Stream Analytics (OSA) for stream analytics, an OSA pipeline generates processing logs on multiple nodes as per the publish configuration. These processing logs help to monitor the health of the pipeline.

In accordance with an embodiment, by default, only the warning and error log messages are generated by the pipeline to optimize the cost (performance and space). At a time when the user sees frequent warning/error messages, and wants to diagnose the root cause, the above-described approach can be used to cause the application to generate lower-level log messages (e.g., info, debug, or trace messages) for a particular period of time, without disrupting/stopping the running application.

Example Implementation

In accordance with an embodiment, the dynamic log update feature as described herein creates a task with the new log configuration values for the components and executes it in all stream processing nodes using the same process by which the streaming application submits streaming data for processing. The new configuration values can be submitted by an administrator via a user interface or command line interface, which uses JMX or Kafka messaging to initiate the creation of a task to the master node (e.g., in a Spark environment, the driver of the Spark application).

Example JMX Management Console Interface

Figure 15:
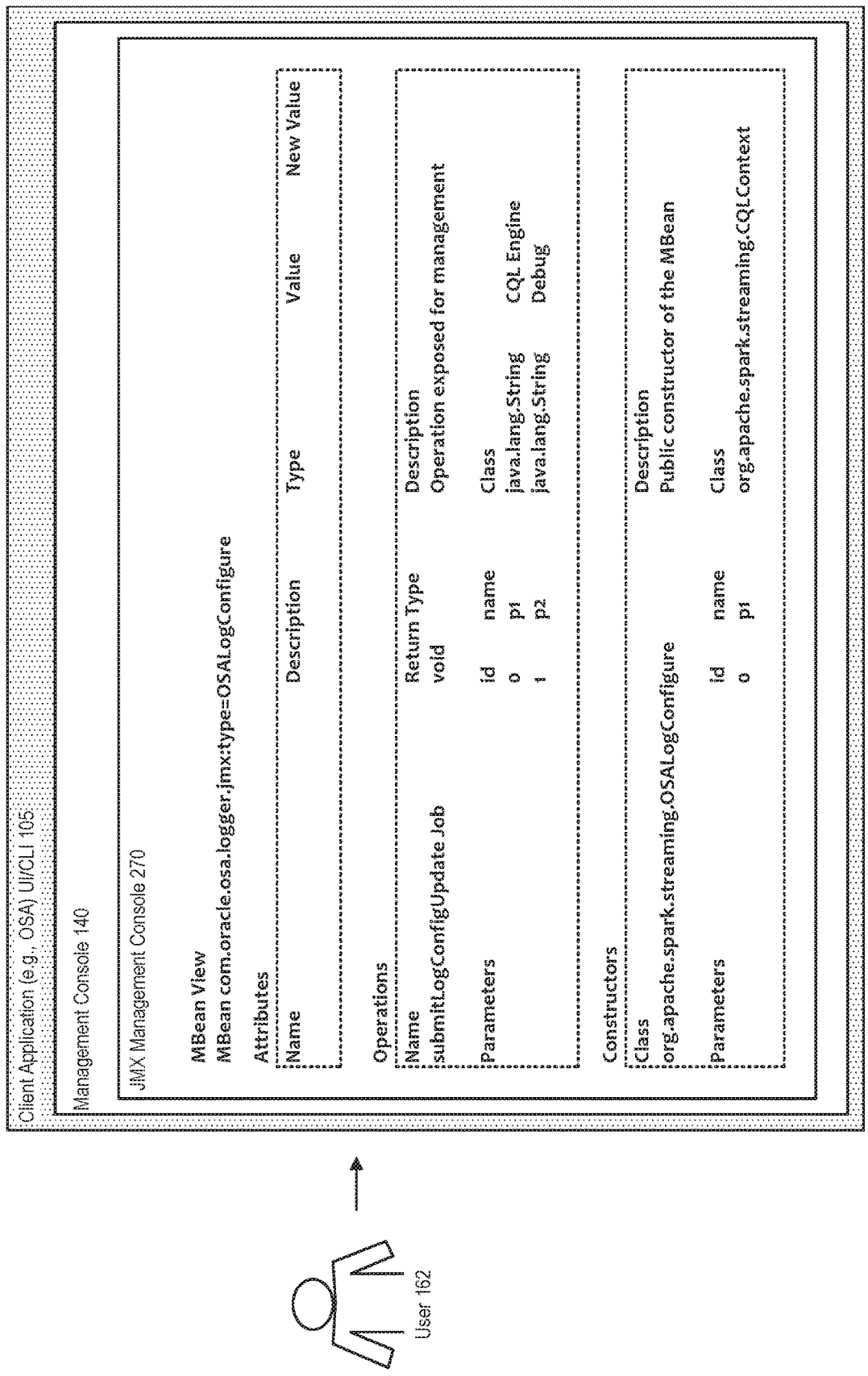
FIG. 15 illustrates an example management console, for dynamic log management of stream processing in a distributed environment, in accordance with an embodiment.

FIG. 15 illustrates an example management console, for dynamic log management of stream processing in a distributed environment, in accordance with an embodiment.

As illustrated in FIG. 15, in accordance with an embodiment and the example JMX management console 270 illustrated therein, the user interface enables configuration options which can be extended with other options (e.g., destination, retention) whenever required.

Example User Interface

Figure 16:
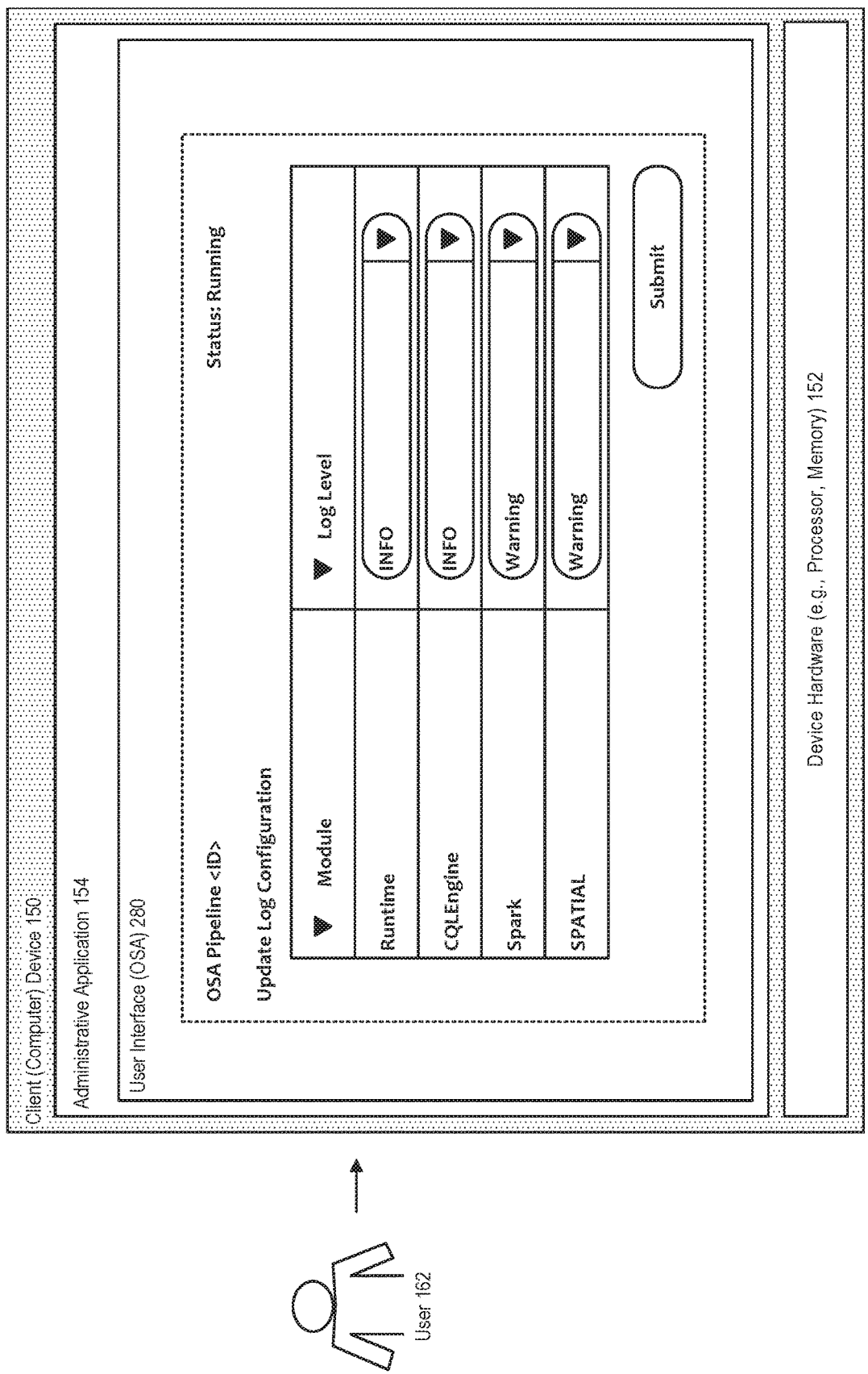
FIG. 16 illustrates an example user interface, for dynamic log management of stream processing in a distributed environment, in accordance with an embodiment.

FIG. 16 illustrates an example user interface, for dynamic log management of stream processing in a distributed environment, in accordance with an embodiment.

As illustrated in FIG. 16, in accordance with an embodiment and the example user interface 280 illustrated therein, the system enables a user to provide a logging configuration for the streaming application, including for example to set configuration logging levels, such as in this example "INFO" or "WARN" to be associated with various modules.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although many of the features and techniques described herein are illustrated using the example of a Spark cluster, Kafka environment, and Oracle Stream Analytics (OSA) environment; in accordance various embodiments, the features and techniques can be similarly used with other types of stream analytics systems or distributed computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for dynamic log management of stream processing in a distributed environment, comprising:
a computer including a processor, that enables a streaming application to be deployed or otherwise published to a distributed environment that includes a cluster, to execute as a client application;
wherein a master node operating as a cluster manager coordinates with a plurality of worker nodes, to commit tasks associated with the streaming application, to be processed by one or more of the worker nodes, each of the one or more worker nodes comprising a logger configured to log data at an initial logging level; and
wherein a configuration job is generated from one of the tasks and can be committed to the cluster to operate with the cluster manager to determine a set of working nodes that are currently associated with the streaming application to execute one or more configuration tasks from the generated configuration job using a same process by which the streaming application submits streaming data for processing and performed as part of running the streaming application, and modify a logger configuration at one or more loggers of the determined set of working nodes, to record or otherwise provide log data according to a modified logging level.

2. The system of claim 1, wherein a log-configuration application operates with the cluster manager to determine the set of working nodes currently associated with the streaming application, and modify the logger configuration at the determined set of working nodes, to record or otherwise provide log data according to a modified logging level in order to provide lower-level log messages.

3. The system of claim 1, wherein the system enables a stream application or pipeline including an application processing logic, to be deployed or otherwise published to a distributed environment.

4. The system of claim 1, wherein the cluster is a Spark cluster.

5. The system of claim 1, wherein the client application is associated with a user interface, and communicates via JMX with a Kafka environment or other stream processing environment that the streaming application can use to receive and set job information.

6. The system of claim 1, whereupon a value being specified for logging level, the system commits the configuration job as a separate log configuration application, which operates with the cluster manager to change the logger configuration on the set of working nodes that are currently associated with the streaming application to the modified logging level, so that the streaming application's next processing batch accepts a new logger configuration.

7. A method for dynamic log management of stream processing in a distributed environment, comprising:
providing, at a computer including a processor, a streaming application to be deployed or otherwise published to a distributed environment that includes a cluster, to execute as a client application;
wherein a master node operating as a cluster manager coordinates with a plurality of worker nodes, to commit tasks associated with the streaming application, to be processed by one or more of the worker nodes, each of the one or more worker nodes comprising a logger configured to log data at an initial logging level; and
wherein a configuration job is generated from one of the tasks and can be committed to the cluster to operate with the cluster manager to determine a set of working nodes that are currently associated with the streaming application to execute one or more configuration tasks from the generated configuration job using a same process by which the streaming application submits streaming data for processing and performed as part of running the streaming application, and modify a logger configuration at one or more loggers of the determined set of working nodes, to record or otherwise provide log data according to a modified logging level.

8. The method of claim 7, wherein a log-configuration application operates with the cluster manager to determine the set of working nodes currently associated with the streaming application, and modify the logger configuration at the determined set of working nodes, to record or otherwise provide log data according to a modified logging level in order to provide lower-level log messages.

9. The method of claim 7, wherein the system enables a stream application or pipeline including an application processing logic, to be deployed or otherwise published to a distributed environment.

10. The method of claim 7, wherein the cluster is a Spark cluster.

11. The method of claim 7, wherein the client application is associated with a user interface, and communicates via JMX with a Kafka environment or other stream processing environment that the streaming application can use to receive and set job information.

12. The method of claim 7, whereupon a value being specified for logging level, the system commits the configuration job as a separate log configuration application, which operates with the cluster manager to change the logger configuration on the set of working nodes that are currently associated with the streaming application to the modified logging level, so that the streaming application's next processing batch accepts a new logger configuration.

13. A non-transitory computer readable storage medium, including instructions stored thereon which when read and executed by one or more computers cause the one or more computers to perform a method comprising:
providing, at a computer including a processor, a streaming application to be deployed or otherwise published to a distributed environment that includes a cluster, to execute as a client application;
wherein a master node operating as a cluster manager coordinates with a plurality of worker nodes, to commit tasks associated with the streaming application, to be processed by one or more of the worker nodes, each of the one or more worker nodes comprising a logger configured to log data at an initial logging level; and
wherein a configuration job is generated from one of the tasks and can be committed to the cluster to operate with the cluster manager to determine a set of working nodes that are currently associated with the streaming application to execute one or more configuration tasks from the generated configuration job using a same process by which the streaming application submits streaming data for processing and performed as part of running the streaming application, and modify a logger configuration at one or more loggers of the determined set of working nodes, to record or otherwise provide log data according to a modified logging level.

14. The non-transitory computer readable storage medium of claim 13, wherein a log-configuration application operates with the cluster manager to determine the set of working nodes currently associated with the streaming application, and modify the logger configuration at the determined set of working nodes, to record or otherwise provide log data according to a modified logging level in order to provide lower-level log messages.

15. The non-transitory computer readable storage medium of claim 13, wherein the system enables a stream application or pipeline including an application processing logic, to be deployed or otherwise published to a distributed environment.

16. The non-transitory computer readable storage medium of claim 13, wherein the cluster is a Spark cluster.

17. The non-transitory computer readable storage medium of claim 13, wherein the client application is associated with a user interface, and communicates via JMX with a Kafka environment or other stream processing environment that the streaming application can use to receive and set job information.

18. The non-transitory computer readable storage medium of claim 13, whereupon a value being specified for logging level, the system commits the configuration job as a separate log configuration application, which operates with the cluster manager to change the logger configuration on the set of working nodes that are currently associated with the streaming application to the modified logging level, so that the streaming application's next processing batch accepts a new logger configuration.

* * * * *